United States Patent [19]
Gannon

[11] 3,982,611
[45] Sept. 28, 1976

[54] DISC BRAKE TORQUE REGULATING STRUCTURE

[75] Inventor: Jack Edward Gannon, Coventry, England

[73] Assignee: Girling Limited, Birmingham, England

[22] Filed: Oct. 10, 1974

[21] Appl. No.: 513,848

Related U.S. Application Data

[63] Continuation-in-part of Ser. No. 343,979, March 22, 1973, abandoned.

[30] Foreign Application Priority Data

Mar. 23, 1972 United Kingdom............... 13562/72

[52] U.S. Cl.............................. 188/71.1; 188/73.1; 188/73.2; 188/218 XL; 192/107 R; 192/70.14

[51] Int. Cl.²......................................... F16D 55/00

[58] Field of Search................. 188/73.1, 73.2, 71.6, 188/218 XL, 264 E, 251 R, 250 B, 71.1; 192/107 R, 70.14

[56] References Cited

UNITED STATES PATENTS

| 1,928,633 | 10/1933 | Rockwell........................... 188/73.2 |
| 2,214,900 | 9/1940 | Evans........................... 192/107 R X |
| 2,304,368 | 12/1942 | Milan........................... 188/73.2 X |
| 3,887,043 | 6/1975 | Hernick....................... 188/250 B X |

FOREIGN PATENTS OR APPLICATIONS

| 64,352 | 10/1949 | Netherlands.................... 192/107 R |
| 787,579 | 12/1957 | United Kingdom.......... 188/218 XL |

*Primary Examiner*—George E. A. Halvosa
*Attorney, Agent, or Firm*—Scrivener Parker Scrivener and Clarke

[57] ABSTRACT

A disc brake includes a friction element which has a portion of increased axial thickness defining an initial friction surface, the center of pressure of this surface being radially offset from the center of pressure of the whole friction surface of the element so that a relatively large braking torque can be developed while the element is bedding in.

14 Claims, 9 Drawing Figures

DISC BRAKE TORQUE REGULATING STRUCTURE

SPECIFIC DESCRIPTION

This application is a continuation-in-part of my U.S. patent application Ser. No. 343,979, filed Mar. 22, 1973 now abandoned.

This invention relates to improvements in disc brakes for vehicles of the kind in which a friction element on a first brake member is adapted to be brought into engagement with the surface of a second brake member, one of the brake members being a disc rotatable relative to the other member.

In one known type of disc brake normally fitted on road vehicles, the second brake member is an axially fixed rotatable disc and the fraction is mounted on an axially movable non-rotatable member, and to balance the axial braking loading on the disc a corresponding friction element is adapted to be urged into engagement with an opposed face of the disc which is thus clamped between the friction elements. In a second known type of brake disc brake normally fitted on off-highway vehicles, the first brake member is an axially movable rotatable disc and the second brake member is an axially fixed non-rotatable member.

Usually the friction element is a block of substantially rigid substantially incompressible friction material including asbestos fibres chemically bonded together which is moulded or rivetted to a metal back plate in the first type of brake or to the disc in the second type of brake.

Friction elements for brakes of the first type are usually of small area and of small extent in the circumferential direction leaving most of the disc uncovered for cooling whereas friction elements for the second type of brake are usually annular and may be at least partially oil-immersed to assist heat dissipation.

It is important that the braking torque occurring between the face of the friction element and the associated face of the second brake member for a given clamp load or reaction force should remain substantially constant throughout the wear life of the friction material so that rotation of the disc during braking is not resisted differentially at the opposed braking faces and so that different braking does not occur between different wheels of the vehicle. The braking torque is a function of the reaction, the distance from the axis of the rotating disc at which the reaction acts, and the co-efficient of friction between the face of the friction element and the face of the second brake member. The reaction itself is a function of the pressure applied to the brake and the area of the friction element. Conventionally the reaction is considered as a point force acting at the centre of pressure of the friction element and the radial distance of this centre of pressure from the axis of the disc is known as the effective radius of the friction element.

It is known that the co-efficient of friction of many friction materials relative to the braking surface of the second brake member changes after those materials have been subject to one or more brake applications, and the need to "bed in" friction elements before a customer uses the vehicle is well known. However, proper "bedding in" is not always possible, particularly with off-highway vehicles which are usually transported to the customer.

According to this invention, in a disc brake of the kind set forth the friction element includes rigid friction material which is substantially non-deformable irrespective of the magnitude of a brake applying load and which is subject to a change in its co-efficient of friction relative to the second brake member during bedding of the friction element, and an initial friction surface which is adapted to engage the second brake member and to be worn away before the whole friction surface of the element is engaged, the initial friction surface having an area less than the area of the whole friction surface and an effective radius larger than that of the whole friction surface is the co-efficient of friction increases during bedding but smaller if the co-efficient of friction decreases during bedding.

The axial thickness of the portion of the friction element defining the initial friction surface exceeds the thickness of the friction element after bedding by an amount which is small compared to the thickness of the element and the volume of this portion and its radial position may be so selected and arranged to ensure that, for a given reaction when the brake is applied, the braking torque developed during bedding substantially equals the torque developed after the whole friction surface has bedded in when the co-efficient of friction remains substantially constant. Since the area of the initial friction surface is small it is worn relatively quickly and a fully bedded portion of the friction element is available while the remainder of the friction surface is bedding in. However, the initial friction surface is so constructed, positioned and arranged positively to prevent the whole area of the friction material from engaging with the second brake member until the said initial friction surface has been worn away.

The initial friction surface may be formed by adding friction material to the friction element, the added friction material being different to or preferably the same as the friction material of the friction element.

Preferably the initial friction surface is formed integrally with the friction element by moulding or by machining away the remainder of the friction surface of the element by the required amount.

Also it is preferred that the friction element includes a second friction surface which does not wear substantially while the initial friction surface is being worn and is itself worn away before the whole friction surface is engaged.

The initial friction surface and/or the second friction surface may be arranged to increase progressively in area during bedding.

The portion of the friction element defining the second friction surface may have an axial thickness less than that of the portion defining the initial friction surface so that no wear of the second surface occurs before the initial surface is worn away. Alternatively the portion of the friction element defining the second friction surface may have a variable thickness, the area of maximum thickness being negligible compared to the area of the first friction surface.

In one embodiment of this invention a disc brake comprises one or more disc adapted to be rotatably and slidably mounted on a shaft for axial movement towards a stationary brake member by actuating means, each disc carrying a generally annular friction element having a generally annular initial friction surface adapted to engage the surface of the stationary member and to be worn away before the whole friction surface of the element is engaged, the effective radius of the initial friction surface being larger than the effective radius of the whole friction surface.

Several embodiments of disc brakes according to the invention will be described and illustrated in the accompanying drawings, in which.

Figure 1:
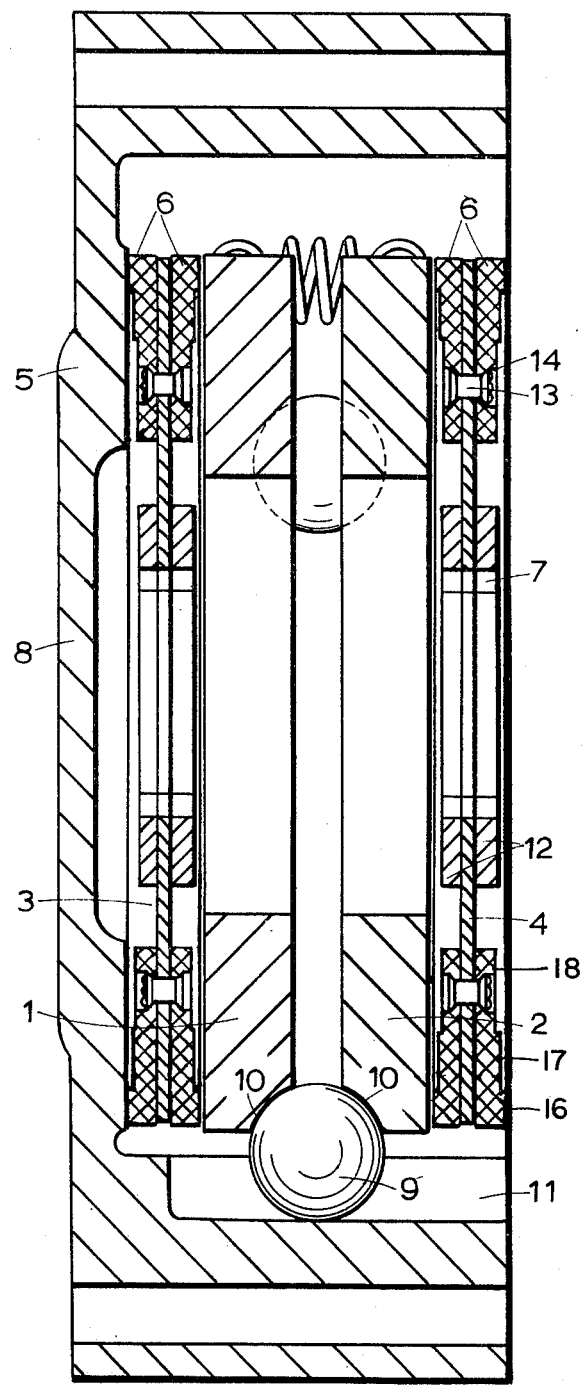
FIG. 1 is a section through a multi-plate disc plate.
Figure 2:
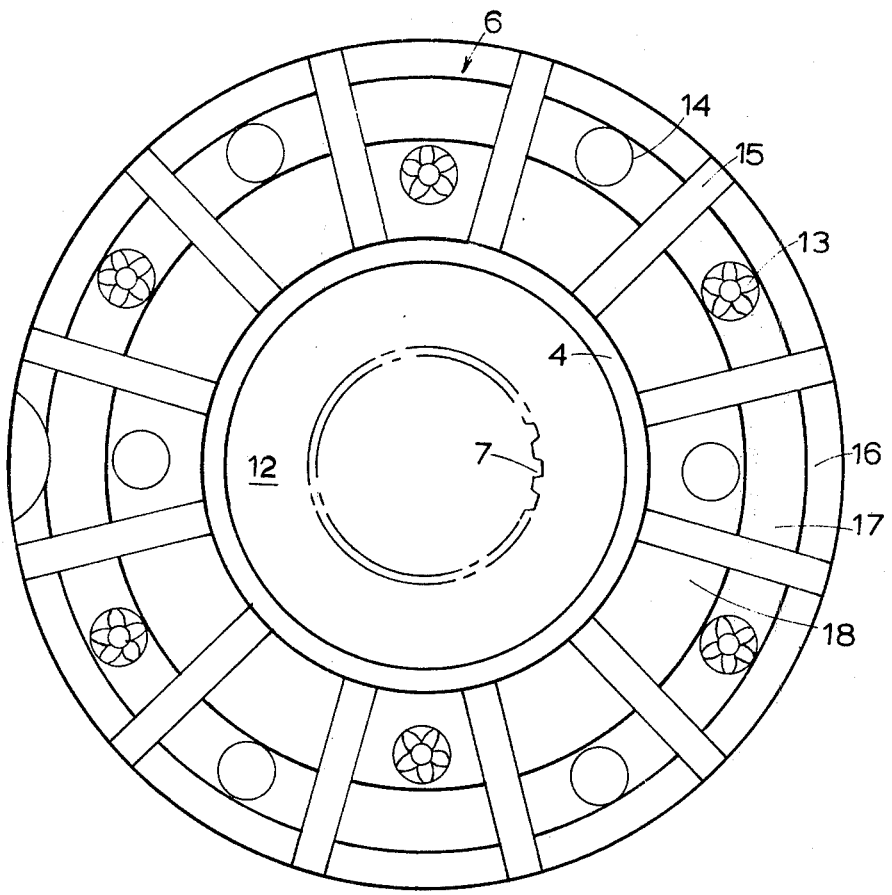
FIG. 2 is an end view of a disc in FIG. 1.
Figure 3:
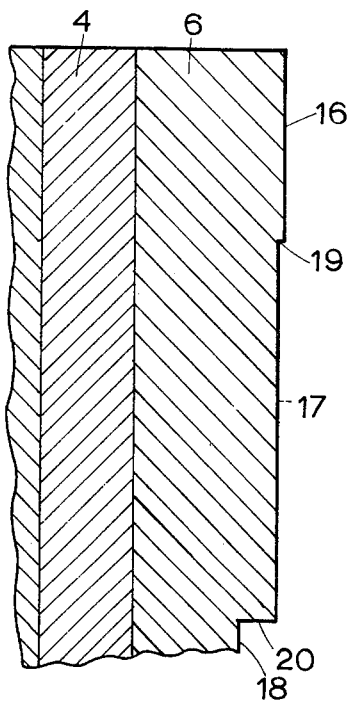
FIG. 3 is an enlarged scrap section of the disc in FIG. 2.

In a multi-plate disc brake illustrated in FIGS. 1 to 3 two co-operating pressure plates 1, 2 are located between two rotatable discs 3, 4 within a rigid stationary cylindrical housing 5. The discs which carry friction elements 6 on each face are slidably mounted by means of splines 7 on a rotatable shaft (not shown). When the pressure plates are urged apart they engage the discs which are frictionally gripped between the pressure plates and machined surfaces of the end wall 8 of the housing and a complementary end cover (not shown) secured to the open end of the housing, the end wall and the cover forming the second brake members.

Actuating means for the brake comprises means for moving the pressure plates angularly in opposite directions and balls 9 working in complementary inclined ramps 10 in the adjacent surface of the plates, the balls moving the plates axially. Means for initiating the angular movement of the plates are not shown and can comprise a pull rod pivotally connected to divergent links of which the other ends are pivotally connected to lugs on the respective plates. Any other convenient means can be employed for this purpose, as for example, a cam on an angularly movable shaft which is permitted a limited movement in a circumferential direction in the housing, the cam operating between complementary radial lugs on the pressure plates. As shown the balls 9 are also located in angularly spaced axial grooves 11 in the inner peripheral surface of the housing so that they are constrained against angular movement, so limiting the angular movement of one pressure plate. In another arrangement the balls are located wholly between the plates and the angular movement of one plate is arrested by engagement of a lug on the plate with a stop abutment on the housing.

The central portion of each disc 4 is stiffened by an annular plate 12 welded or otherwise secured to each side of the disc. The friction elements 6 are annular and radially outwardly spaced from the stiffening plates and are secured to the disc by staggered rivets 13 located in countersunk holes 14. The friction element is formed with relatively deep angularly spaced radial grooves 15 for cooling purposes and which divide the friction surface of the element into a series of segments.

Each friction element is constructed from friction material which is substantially rigid and substantially imcompressible and substantially non-deformable irrespective of the magnitude of a brake applying load from the actuating means. Furthermore, the discs 3, 4, the friction elements 6, and the pressure plates 1, 2 are sufficiently rigid that operation of the brake does not depend on resilient deformation of the discs 3, 4 the friction elements 6, and the pressure plates 1, 2.

The friction material from which each friction element is constructed may be of any commercially available conventional type. For example one suitable type is a medium friction, rigid moulded, asbestos based material containing brass particles which is substantially incompressible having a compression of 0.7% when subjected to a pressure of 2000 p.s.i. Since the thickness of a new friction element is 0.2 inches, the maximum compression which is likely to occur will be less than 0.002 inches.

Each friction element has an annular initial friction surface 16 at its outer periphery, a radially inner annular second friction surface 17, and an innermost third friction surface 18. In section as shown in FIG. 3 the element is of stepped form, the portions of the elements defining the three friction surfaces being of decreasing axial thickness. The step 19 between the initial and the second friction surfaces is, for example, 0.13 mm (0.005 inches) and the step 20 between the second and third friction surfaces is, for example, 1.3 mm (0.05 inches). The areas of the initial surface 16 and the inner surface 17 are small in comparison with the total area of the whole friction surface of the element.

On the first application of the brake only the initial braking surfaces will engage the pressure plates and the housing and it will be seen that the braking torque will act as an effective radius substantially greater than the effective radius of the friction element as a whole. The initial friction surfaces will bed in relatively quickly and the full co-efficient of friction between these surfaces and the stationary surfaces will be available when these initial surfaces have worn down to the level of the second friction surfaces and while the second friction surfaces are bedding in. Similarly when the second friction surfaces have bedded in the braking torque will act at a decreased effective radius until the second surfaces have worn down to the third friction surfaces when the whole friction surfaces of the elements will be engaged.

The relative areas of the surfaces 16 and 17 and the total area of the whole friction surface of the element is chosen so that the initial surface 16 and 17 will wear quickly in comparison with the rate of wear of the whole surface, after they have bedded in.

A compressible or deformable friction material, such as cork, is not satisfactory for the construction of the friction elements 6. With such deformable materials the unit area load will not increase to as high a load, as with the substantially rigid substantially incompressible material used herein and the energy absorbtion will not be as great. Since the load and the energy absorbtion are proportional to the wear rate of the material, bedding will not occur so readily or so soon.

Figure 4:
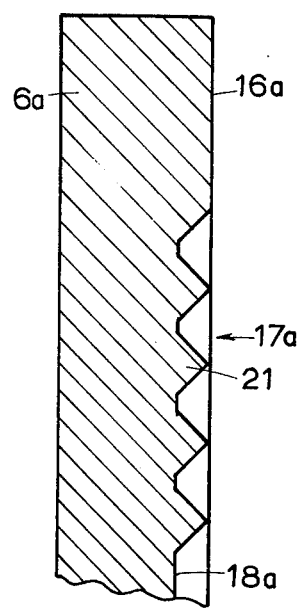
FIG. 4 is a scrap section of a modification.

In the modified form of the friction element 6a shown in FIG. 4 the second friction surface 17a is formed by four concentric portions 21 triangular in section with their apices level with the initial friction surface 16a. These apices will engage the stationary member when the initial friction surface is engaged but their effect will be negligible until the initial friction surface has worn away. The spices can be axially spaced from the initial friction surface by a small amount, for example 0.13 mm (0.005 inches). In both cases the effective areas of the second friction surface will increase progressively from substantially zero to a maximum when the third surface begins to bed in.

There can by any desired number of portions 21, and the initial surface 16a itself can consist of a plurality of concentric bands. It is also possible to form the portions 21 in a spiral configuration rather than the separate concentric formations shown.

The second and third friction surfaces 17a, 18a can be formed by machining after initial formation of the element though they could be formed during molding of the element.

Figures 5, 6, 7, 8:
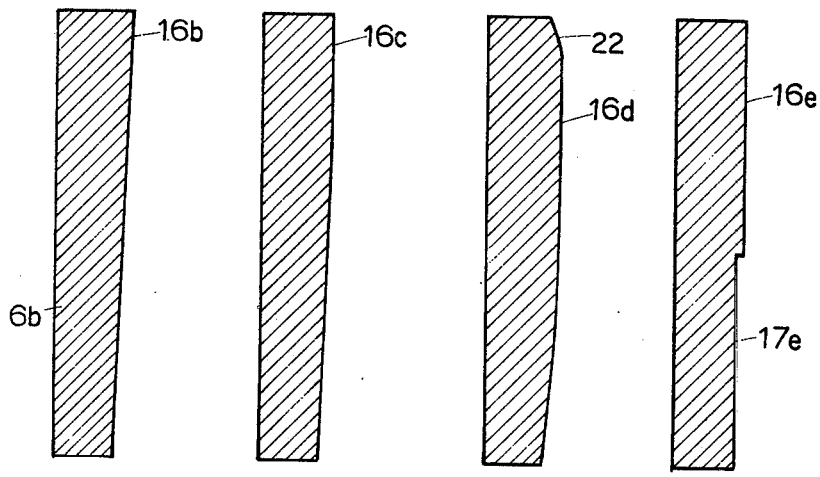
FIGS. 5 to 8 are sections through various friction elements for the brake of FIG. 1.

FIG. 5 shows a friction element 6b having a continuously decreasing axial thickness from the initial friction surface 16b at its outer periphery to its inner periphery. In this form of the element the effective radius of the element will progressively decrease as the bedded friction surface increases. In FIG. 6 the radial dimension of the initial friction surface 16c is increased to about a quarter of the radial width of the element. In FIG. 7 the initial friction surface 16d is set in by a small amount 22 from the outer periphery of the element and in FIG. 8 the element is stepped as in FIG. 3 to give only an initial friction surface 16e and a second friction surface 17e the radial width of the initial surface being substantially half the radial width of the element.

Figure 9:
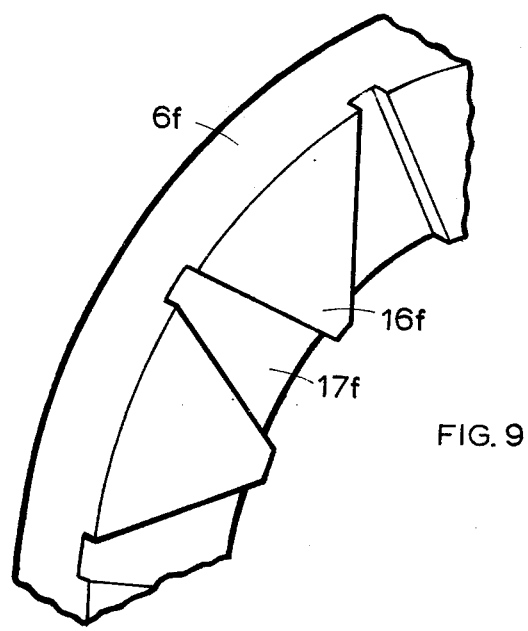
FIG. 9 is a perspective view of another friction element.

FIG. 9 shows a friction element 6f which is angularly stepped instead of being radially stepped, the initial friction surface 16f spanning the radial width of the element. In this case the initial surface and the second surface 17f are in the form of oppositely directed wedges whereby the area of the initial surface decreases in the radial direction towards the axis of the element so that its effective radius is greater than the effective radius of the element as a whole.

In other forms of brake element which are not illustrated the initial friction surface can comprise a plurality of concentric annular surfaces spanning the radial width of the element, the spacing and areas of the surfaces being arranged so that the effective radius of the total initial surface is greater than the effective radius of the element as a whole. The friction surface of the element can be crowned, the initial friction surface being at the crown and at a greater effective radius than that of the element as a whole. Similarly the initial friction surfaces shown in FIG. 9 need not be wedge shaped but any shape having a greater area radially beyond the effective radius of the element as a whole than the area radially inside this effective radius.

The foregoing description has been limited to forms where the effective radius of the initial friction surface is greater than the effective radius of the element as a whole since for most friction materials the co-efficient of friction increases during bedding. However, it is possible for certain materials to behave in the opposite manner and for these forms described would be arranged in the opposite sense with the effective radius of the initial surface less than the effective radius of the element as a whole.

Although the foregoing description has been directed to a multi-plate disc brake, friction elements according to this invention can be readily adapted for use in spot type caliper brakes for highway vehicles.

I claim:

1. In a disc brake for a vehicle comprising first and second brake members, one of said members being a disc rotatable relative to the other member, a body of friction material attached to said first brake member, said first and second brake members and said friction material being sufficiently rigid that the operation of the brake does not depend on resilient deformation of said brake members and of said friction material, a friction surface on said second brake member, and actuating means for bringing said friction material into engagement with said friction surface of said second brake member to apply the brake, said friction material being substantially rigid and non-deformable irrespective of the magnitude of a brake applying load applied by said actuating means, said friction material being of a material whose coefficient of friction changes relative to said second brake member during bedding of said friction material including an initial friction surface having an area less than said friction surface of said second brake member, said initial surface being positioned so as to be engageable with a corresponding portion of said friction surface of said second brake member and be worn away thereby during bedding of said friction material before the whole friction surface of said second brake member is engaged by said friction material after bedding, said initial friction surface having an effective radius larger than the effective radius of said whole friction surface if the coefficient of friction increases during bedding but smaller if the coefficient of friction decreases during bedding.

2. A disc brake according to claim 1, wherein the effective radius, the area, and the axial thickness of the said portion of said friction material defining said initial friction surface is so selected and arranged to ensure that, for a given reaction when the brake is applied, the braking torque developed during bedding substantially equals the torque developed after said whole friction surface has bedded in.

3. A disc brake according to claim 1, wherein said friction material includes a second friction surface which does not wear substantially while said initial friction surface is being worn and is itself worn away before said whole friction surface of said friction material is engaged.

4. A disc brake according to claim 3, wherein said initial friction surface is of substantially constant axial thickness.

5. A disc brake according to claim 4, wherein said friction material is radially stepped.

6. A disc brake according to claim 4, wherein said friction material is angularly stepped, a greater area of said initial friction surface being radially offset from said effective radius of said whole friction surface of said element.

7. A disc brake according to claim 3, wherein said friction material defining said initial friction surface is of varying thickness so that the area of said initial surface increases during bedding.

8. A disc brake according to claim 3, wherein said friction material defining said second friction surface is of substantially constant axial thickness.

9. A disc brake according to claim 3, wherein said friction material defining said second friction surface is of varying thickness so that the area of said second surface increases during bedding.

10. A disc brake according to claim 1, wherein the said initial friction surface is formed by machining the friction surface of said friction element.

11. A disc brake as claimed in claim 1, wherein said initial friction surface is of an area which is already small in comparison with the area of said whole friction surface whereby said initial friction surface will wear quickly in comparison with the rate of wear of said whole friction surface.

12. A disc brake as claimed in claim 1, wherein said initial friction surface is so constructed, positioned and arranged positively to prevent the whole area of said friction material from engaging with said friction surface of said second brake member until said initial friction surface has been worn away.

13. A disc brake for a vehicle comprising a stationary brake member having a brake surface, at least one disc adapted to be mounted on a rotatable shaft for rotation therewith and for sliding movement relative thereto in an axial direction towards said stationary brake member, actuating means for urging said disc towards said stationary brake member, a generally annular body of friction material attached to said disc and having a whole friction surface adapted to engage a corresponding whole brake surface of said stationary brake member, said body of friction material including a generally annular initial friction surface having an area less than the area of said whole friction surface and adapted to engage a corresponding portion of the brake surface of said stationary member so as to be worn away thereby during bedding of said body of friction material before the whole friction surface of said body of friction material can be engaged with said whole brake surface, the effective radius of said initial friction surface being longer than the effective radius of said whole friction surface, said disc, said friction material and said stationary brake member being sufficiently rigid that the operation of the brake does not depend on resilient deformation of said disc, friction material and stationary brake member, said friction material being substantially rigid and non-deformable irrespective of the magnitude of a brake applying load applied by said actuating means and said friction material being of a material whose coefficient of friction changes relative to said brake member during bedding of said friction material.

14. A disc brake for a vehicle comprising a disc adapted to be mounted in an axially fixed position on a rotatable shaft and a brake member mounted on each side of the disc in a non-rotatable brake housing, a body of friction material attached to each of said brake members adapted to be axially moved into engagement with the friction surfaces of said disc by actuating means, operating on said brake members, said disc, said brake members and said friction material being sufficiently rigid that the operation of the brake does not depend on the resilient deformation of said disc, brake members and said friction material, each of said bodies of friction material being substantially rigid and non-deformable irrespective of the magnitude of a brake applying load applied by said actuating means, each of said bodies of friction material being of a material whose coefficient of friction relative to the braking surface of said disc changes during bedding of said bodies of friction material and each of said bodies having a whole friction surface which includes an initial friction surface of less area than said whole friction surface adapted to engage a portion of the friction surface of said disc on the respective sides thereof and to be worn away before the whole friction surface of said body engages said disc, the effective radius of said initial friction surface of said body being larger than the effective radius of said whole friction surface if the coefficient of friction increases during bedding but small if the coefficient of fraction decreases during bedding.

* * * * *